(12) United States Patent
Leston et al.

(10) Patent No.: US 11,023,492 B2
(45) Date of Patent: Jun. 1, 2021

(54) DEFERRED SYNCHRONIZATION FOR WORK UNIT-RELATED DATA

(71) Applicant: Guidewire Software, Inc., Foster City, CA (US)

(72) Inventors: David Leston, Hayward, CA (US); Benjamin David Brantley, San Carlos, CA (US)

(73) Assignee: Guidewire Software, Inc., San Mateo, CA (US)

( * ) Notice: Subject to any disclaimer, the term of this patent is extended or adjusted under 35 U.S.C. 154(b) by 617 days.

(21) Appl. No.: 14/802,944

(22) Filed: Jul. 17, 2015

(65) Prior Publication Data

US 2016/0342671 A1 Nov. 24, 2016

Related U.S. Application Data

(60) Provisional application No. 62/164,393, filed on May 20, 2015.

(51) Int. Cl.
*G06F 16/27* (2019.01)

(52) U.S. Cl.
CPC .................. *G06F 16/273* (2019.01)

(58) Field of Classification Search
CPC ........... G06F 17/30578; G06F 16/2372; G06F 16/273
USPC ....................................................... 707/634
See application file for complete search history.

(56) References Cited

U.S. PATENT DOCUMENTS

| | | | | |
|---|---|---|---|---|
| 6,141,664 | A * | 10/2000 | Boothby | G06F 16/2308 |
| 7,966,369 | B1 * | 6/2011 | Briere | G06F 16/248 709/204 |
| 8,650,052 | B1 * | 2/2014 | Anagnoson | G06Q 40/00 705/4 |
| 10,078,679 | B1 * | 9/2018 | Shefferman | G06F 16/958 |
| 2005/0147130 | A1 * | 7/2005 | Hurwitz | G06F 16/273 370/503 |
| 2006/0106881 | A1 * | 5/2006 | Leung | G06F 17/30578 |
| 2006/0230184 | A1 * | 10/2006 | Velline | H04W 4/18 709/246 |
| 2007/0078950 | A1 * | 4/2007 | Hopkins | H04L 67/2804 709/217 |
| 2008/0270547 | A1 * | 10/2008 | Glickstien | H04L 67/1095 709/206 |
| 2009/0013011 | A1 * | 1/2009 | Barker | G06F 16/93 |
| 2009/0248695 | A1 * | 10/2009 | Ozzie | H04L 67/34 |
| 2010/0100527 | A1 * | 4/2010 | Gwozdz | G06F 16/273 707/610 |

(Continued)

*Primary Examiner* — Ashish Thomas
*Assistant Examiner* — Nargis Sultana
(74) *Attorney, Agent, or Firm* — Van Pelt, Yi & James LLP

(57) ABSTRACT

Deferred data synchronization includes obtaining at least a portion of a copy of a work unit from a system of record, the work unit comprising a plurality of categories, each category comprising a set of one or more elements; while a client device is offline with respect to the system of record, performing an offline action that includes a modification to an element of the copy of the work unit, recording locally the modification to the element of the copy of the work unit, and deferring synchronization of the modification with the system of record; and synchronizing the modification with the system of record, including causing the system of record to detect whether the modification is in conflict with the work unit on the system of record.

23 Claims, 7 Drawing Sheets

(56) References Cited

U.S. PATENT DOCUMENTS

| | | | | |
|---|---|---|---|---|
| 2011/0071858 A1* | 3/2011 | Keefer | ............... | G06Q 40/08 |
| | | | | 705/4 |
| 2011/0113092 A1* | 5/2011 | Rakowski | ........... | G06F 9/44505 |
| | | | | 709/203 |
| 2011/0307278 A1* | 12/2011 | Clarke | ............... | G06Q 40/08 |
| | | | | 705/4 |
| 2012/0026951 A1* | 2/2012 | Mace | ............... | H04L 47/801 |
| | | | | 370/329 |
| 2012/0331178 A1* | 12/2012 | Henders | ............ | G06F 16/275 |
| | | | | 709/248 |
| 2014/0040202 A1* | 2/2014 | Hagan | ............... | G06F 16/275 |
| | | | | 707/634 |
| 2014/0067921 A1* | 3/2014 | Prophete | ............ | H04L 67/1095 |
| | | | | 709/203 |
| 2015/0052308 A1* | 2/2015 | Ray | ............... | G06F 9/528 |
| | | | | 711/125 |
| 2015/0172234 A1* | 6/2015 | Triantos | ............ | H04L 51/046 |
| | | | | 715/752 |
| 2015/0244775 A1* | 8/2015 | Vibhor | ............... | G06Q 10/06 |
| | | | | 709/203 |
| 2015/0278030 A1* | 10/2015 | Zhu | ............... | G06F 11/2097 |
| | | | | 707/623 |
| 2015/0358406 A1* | 12/2015 | Scheer | ............... | G06F 11/30 |
| | | | | 709/248 |
| 2015/0378774 A1* | 12/2015 | Vermeulen | ............ | G06F 9/466 |
| | | | | 707/703 |
| 2016/0050177 A1* | 2/2016 | Cue | ............... | G06Q 10/10 |
| | | | | 709/206 |
| 2016/0094560 A1* | 3/2016 | Stuntebeck | ......... | H04L 67/303 |
| | | | | 726/1 |
| 2019/0319793 A1* | 10/2019 | Schooler | ............ | H04L 9/3228 |

* cited by examiner

DEFERRED SYNCHRONIZATION FOR WORK UNIT-RELATED DATA

CROSS REFERENCE TO OTHER APPLICATIONS

This application claims priority to U.S. Provisional Patent Application No. 62/164,393 entitled DEFERRED SYNCHRONIZATION FOR WORK UNIT-RELATED DATA filed May 20, 2015 which is incorporated herein by reference for all purposes.

BACKGROUND OF THE INVENTION

Field work often requires collecting data from disparate locations and gathering the data at a central location. For example, insurance claims adjusters need to gather claim-related data as they visit accident sites; building inspectors need to collect information as they visit buildings; census workers need to gather census data as they go door-to-door to visit families and individuals. Traditionally, these field agents use a spreadsheet or the like to gather data, then manually enter the data into a central database or upload the spreadsheet when they return to the central office.

As mobile computing devices such as laptops, tablets, and smartphones become more powerful, many applications have been developed to support work that needs to be carried out in the field. Existing implementations of such applications often require good connectivity between the mobile device and the central server so that data is continuously updated while it is being gathered. In reality, however, there is often no guarantee of connectivity. For example, when an insurance claims adjuster visits a disaster area with a power outage or unreliable cellular connectivity, there can be a period without any connectivity to the central server. Further, because certain types of work such as insurance claims often involve a large amount of documentation, constantly updating and refreshing the data between the mobile device and the central server would consume a large amount of bandwidth and therefore would be impractical.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Deferred data synchronization permitting offline actions to take place on a client device that has intermittent and not necessarily reliable connectivity with a system of record is described.

Figure 1:
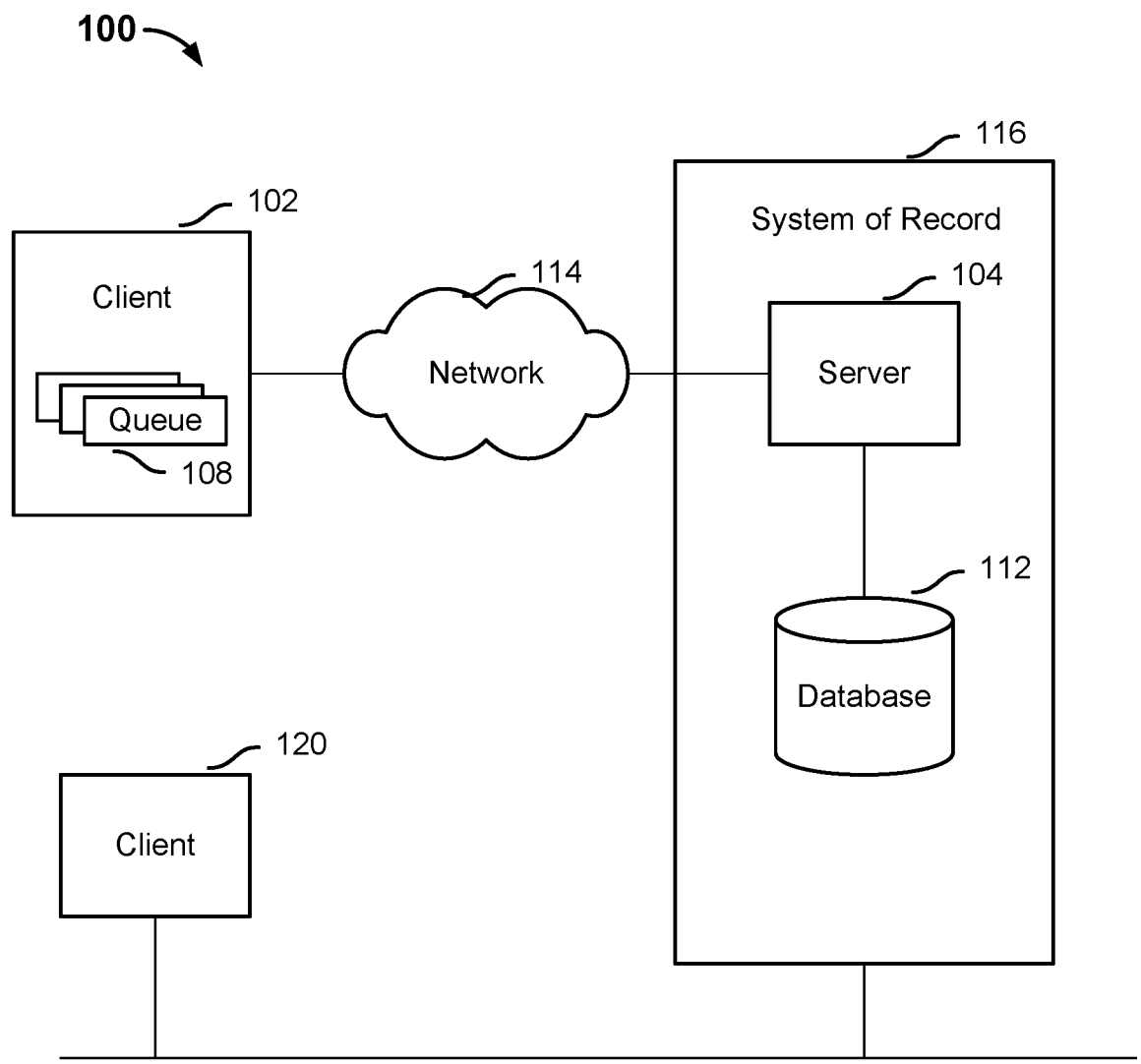
FIG. 1 is a block diagram illustrating an embodiment of a system where deferred data synchronization takes place.

FIG. 1 is a block diagram illustrating an embodiment of a system where deferred data synchronization takes place. In cloud computing system 100, a user (such as an employee working in the field) uses a client device 102 to access a system of record 116 via a network 114. Client device 102 can be a laptop computer, a personal computer, a tablet, a mobile device, a smart phone, a wearable networking device, or any other appropriate computing device comprising a communication interface. In some embodiments, a web browser or a standalone application is installed at client 102 and enables the user to access the applications and/or services hosted by one or more servers 104 via network 114. System of record 116 is the main repository of information. As shown, system of record 116 comprises one or more servers 104 (which may comprise a single or multiple devices) and a database 112 storing the data used by the hosted applications and/or services. The database can be on a separate device from the server or be integrated with the server.

Client device 102 communicates with server 104 via a network 114, which can include but is not limited to the Internet, a wide area network (WAN), a metropolitan area network (MAN), a local area network (LAN), a virtual private network (VPN), a wireless network, a wireline-based network, an Ad Hoc network, etc., or combinations thereof. Network 114 does not necessarily provide constant and reliable connection for the client device to connect to the server. Thus, there are times when client device 102 is offline (e.g., not communicating with, sending data to, and/or receiving data from server 104), and times when client device 102 is online (e.g., communicating with, sending data to, and/or receiving data from server 104).

In the following specification, examples involving a user, who is an insurance claims adjuster working for an insurance carrier, using a browser-based application executing on client device 102 to access a centralized claims processing application hosted for the insurance carrier on server 104 are discussed extensively for purposes of illustration. The architecture and techniques described herein are applicable to other applications.

As will be described in greater detail below, client device 102 obtains copies of work units from system of record 116. When client device 102 is offline, the user is allowed to make modifications to copies of work units using the client device and store data locally at the client device. The modified data is prioritized and temporarily stored in a set of priority queues 108. When client device 102 goes online, the data in the queues are sent according to their respective priority to the application executing on server 104. As used herein, a work unit refers to a set of data that is processed to accomplish a specific purpose. For example, for an insurance policy management system, a work unit can include a claim, a policy, a process, a transaction, etc. In various embodiments, a work unit is formatted as an object, a file, a portion of a file, or the like and can be transmitted between the client application and the server using a preconfigured protocol such as HTTP, remote procedure call (RPC), etc. In the following discussion, a work unit includes an insurance claim that is to be processed by a claims adjuster. Modified work unit data is prioritized and sent to a claims processing application executing on server 104.

In some embodiments, the system of record 116 also interacts with client devices 120 which are consistently online because these client devices have a reliable connection with the system of record (e.g., the devices are connected on the same corporate network or virtual private network (VPN) over a high speed network). These client devices can be, for example, computers used by agents located at the central office. In some embodiments, in an environment where the network connection is consistent and reliable, the client device can directly manipulate work units on the system of record without the need for synchronization. For example, a user of a consistently connected client device can modify an element of a work unit via a browser-based application that instantaneously sends any modification information to the system of record as soon as the modification is made without delay. In contrast, the intermittent connection between device 102 and the system of record makes it difficult for device 102 to directly modify data on the system of record, and for client 102 and the system of record to maintain identical data at all times.

In the example shown, system of record 116 implements a set of rules. Any modifications made to work units on the system of record that violate the rules are deemed to be impermissible or inconsistent modifications and must be prevented or corrected. As will be described in greater detail below, the same rules apply to deferred updates made by clients that are intermittently online such as client 102, as well as any undeferred updates made by clients that are consistently online such as client 120.

Figure 2A:
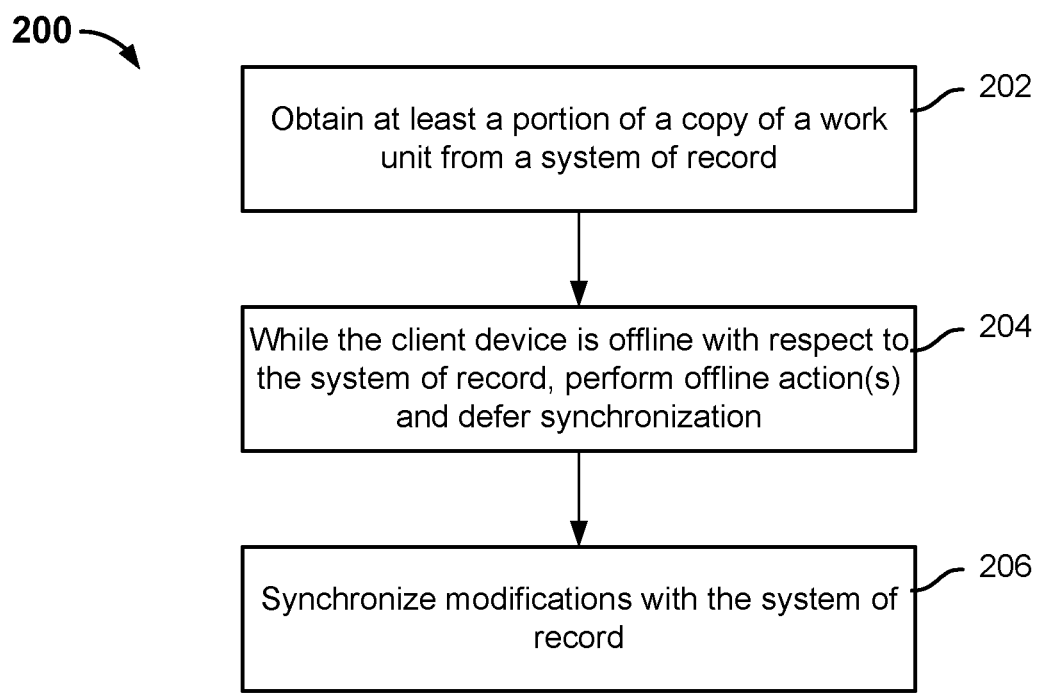
FIG. 2A is a flowchart illustrating an embodiment of a process for performing deferred data synchronization.

FIG. 2A is a flowchart illustrating an embodiment of a process for performing deferred data synchronization. Process 200 can be performed on a system such as 100 of FIG. 1. In some embodiments, the process is performed at least in part by a client device. In some embodiments, when a user is ready to do work and uses the browser (or other application) to access the system of record, process 200 is initiated.

It is assumed that before process 200, the user has not made modifications that have not been synchronized with the system of record (in other words, all the data on the client device is synchronized).

At 202, at least a portion of a copy of a work unit is obtained from a system of record and displayed at the client device. In some embodiments, the work unit is arranged using a hierarchical data structure (e.g., a tree structure). Specifically, the work unit comprises a plurality of categories, and each category comprises a set of one or more elements (the leaf nodes of the tree). Alternatively, each category can comprise one or more levels of subcategories, and the last level of subcategory comprises one or more elements. In some embodiments, the work unit data is stored in an extensible markup language (XML) document or a JavaScript Object Notation (JSON) file. An example of a work unit is an insurance claim associated with an accident. Thus, the client device displays information associated with the claim, such as contact information, list of vehicles involved in the claim, a map of the accident location, a list of damages, a list of estimates for repairs, etc.

In some cases, the user is assigned multiple work units, and copies of these work units assigned to the user are retrieved. However, because the work units can contain large amounts of data, it can be expensive for the client device to obtain all the data for each work unit each time the user starts to do work. Thus, in some embodiments, only work units on the system of record that are different from the copies on the client device are retrieved. In other words, only those work units that have been modified (e.g., by a different client device) since the last time the client device performed data synchronization are retrieved.

In some embodiments, to determine which work units on the system of record are different from the copies on the client device, the client device computes a hash function for each copy of work unit the client device maintains, and sends the hash results to the system of record for comparison. The system of record performs the same hash function computation for each corresponding work unit maintained by the system of record, and compares these hash results with the hash results received from the client device. The same hash results indicate that the copy of the work unit on the client device is the same as the work unit on the system of record, and therefore does not need to be sent to the client. Different hash results indicate that the work unit on the system of record has been modified by another client device since the last time the copy of the work unit on this client device was synchronized with the system of record. Only the modified work units that have different hash results are sent to the client.

For example, suppose the user is assigned work units that are insurance claims with claim identifiers of 2, 9, and 10. A cryptographic hash function such as MD5 is applied to an XML document or a JSON file representing each copy of insurance claims stored locally on the client device to obtain a hash result. The hash results are sent to the system of record, which also computes hash results for the XML documents or JSON files of claims 2, 9, and 10 stored at the system of record. If the hash results of the client copy and the system of record copy for claims 2 and 9 are the same, but the hash results of the client copy and the system of record copy are different for claim 10, then claim 10 has been modified since the client device last performed synchronization. Thus, only data pertaining to claim 10 is sent to the client device at this time.

In the above example, hash values are computed at the work unit level, and modified work units are sent. In various other embodiments, hash values are computed at a finer level of granularity, such as at the category level, the subcategory level, or the element level. These levels can be identified using corresponding identifiers. Only data pertaining to items (e.g., categories, subcategories, elements, etc.) that have different hash values on the client device and on the system of record is sent to minimize bandwidth consumption.

In some embodiments, a version identifier such as a revision number or a time stamp is used instead of a hash function result. For example, when a work unit is updated, a revision number or a time stamp associated with the work unit is updated. Thus, a determination of which work units on the system of record are different from the copies on the client device can be made by comparing the version identifiers on the client and the system of record. For example, if a time stamp associated with a work unit (that has a work unit identifier of 4) on the client device is 2015/01/02/14:05:05 and the time stamp associated with the work unit (that also has a work unit identifier of 4) on the system of record is 2015/03/04/10:09:08, then the work unit has been modified on the system of record and is retrieved to the client device.

At 204, the client device goes offline with respect to the system of record. In some embodiments, the client device is scheduled to go offline after it retrieves the work unit data from the system of record, whether or not the network connection remains available. The scheduling can be done using a timer. The client device will henceforth perform best-effort based synchronization according to a set schedule.

While the client device is offline, one or more offline actions are performed on the client device. In some embodiments, the offline actions include one or more modifications to one or more elements of the copy of the work unit. The user can make these modifications via user interfaces provided by the browser (e.g., in HTML or JavaScript code) or the application. For example, notes, images, videos, etc. can be added to a claim's elements; certain claim element information can be modified. In various embodiments, the text or files can be embedded in a claim element object, a claim element file, a part of a claim file, or the like. Further, references such as links, relative directory paths, etc. to the text or data files can be embedded in the claim element object, and the content of the text or data files can be transmitted separately. The synchronization of the modifications with the system of record is deferred. Specifically, information pertaining to the offline actions is temporarily recorded locally at the client device and not transferred to the system of record while the client device is offline.

In some embodiments, the modification data is temporarily stored using a set of priority queues in memory or other storage of the client device. In various embodiments, copies of the modified data, or pointers or references to the modified data can be stored in the priority queues. In various embodiments, the priority levels of the queues can be set to correspond to different data types or categories. In some embodiments, default priority levels are preconfigured, and the default priority levels can be overridden using graphical user interface tools or configuration files. In some embodiments, data types or categories that typically include less data are assigned higher priority than data types or categories that typically include more data. For example, text notes can be specified to have a higher priority than image files, which can be specified to have a higher priority than video files. As another example, data in the financials category is assigned a higher priority than data in the location category.

Later, at 206, the modifications are synchronized with the system of record. In some embodiments, this synchronization is a best-effort synchronization that takes place at predetermined intervals. In some embodiments, the synchronization includes sending the modification data stored in the priority queues to the system of record according to the respective priority levels of the queues. The synchronization will not necessarily synchronize all the modified data successfully, especially when the connection is poor. For example, if there is intermittent network connection, data stored in a higher level priority queue will be synchronized to the system of record ahead of the data stored in a lower level priority queue.

Later, when it is determined that there is a reliable connection from the client device to the system of record, any remaining unsynchronized data is synchronized with the system of record. In some embodiments, the client device periodically tests the connection with the system of record (e.g., by sending ping packets and checking for acknowledgements and/or round trip time) to determine whether the connection is reliable.

Figure 2B:
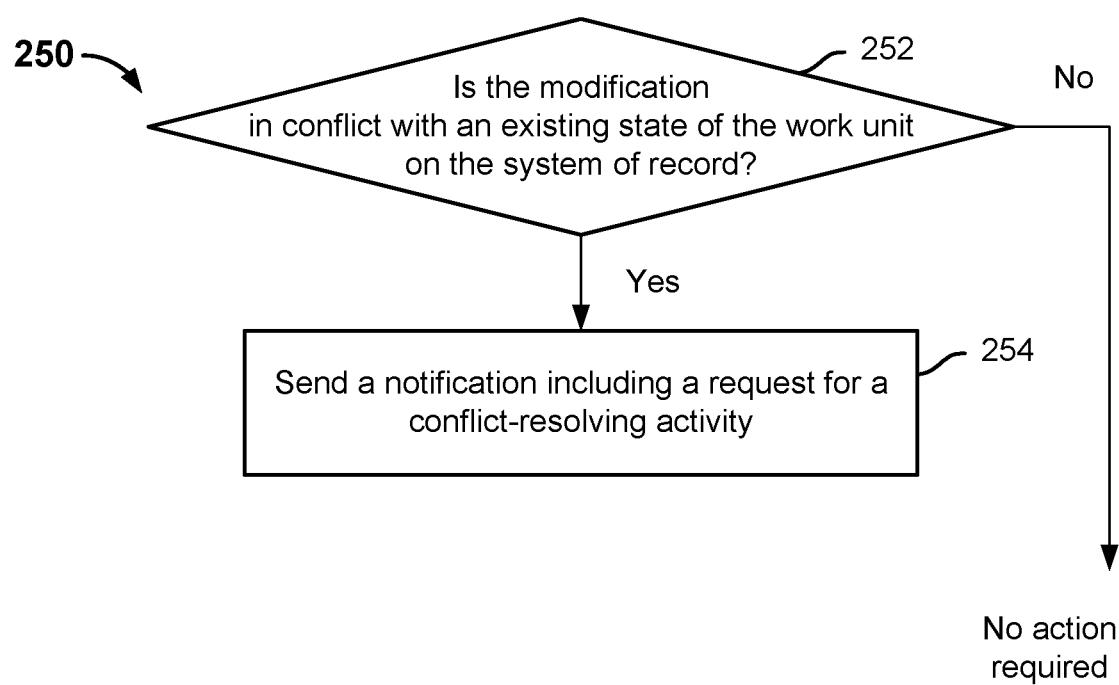
FIG. 2B is a flowchart illustrating a conflict resolution process.

FIG. 2B is a flowchart illustrating a conflict resolution process. Process 250 can be performed as a part of the synchronization step 206 of process 200. While the client device is offline, other client devices can make changes to the work unit. These changes can be in conflict with the modification data received from the client device and need to be resolved when the client device performs synchronization. For example, the claims adjuster can issue a reimbursement check to the claimant in the field, and enter that piece of financial information into the copy of the claim while the client device is offline. Meanwhile, another agent working at the central office of the insurance carrier also issues a reimbursement check for the same amount to the claimant. Because the central office agent's computer is constantly connected to the system of record, the activity performed by the central office agent is immediately updated and recorded by the system of record, while the claims adjuster's activity is deferred for synchronization later. The duplicate activities may lead to a conflict.

Thus, at 252, in response to receiving the modification data, the system of record is caused to determine whether the modification is in conflict with an existing state of the work unit (e.g., the claim) on the system of record.

In some embodiments, because the system of record also interacts with other client devices that are consistently online (e.g., clients 120), the system of record includes a set of rules configured by the system administrator, used to prevent conflicts by these client devices. In some embodiments, the rules are specified by the user using declarative expressions, and compiled into rules objects which are instantiated and used by the server application. The rules can be specified according to predefined formats using a configuration tool that provides user interfaces for entering the parameters, conditions, any expected results, as well as any action to be performed in the event that a rule's conditions are or are not met. For example, the rules may specify that for a specific financial transaction, only a single check can be issued for a specific amount; for a specific contact, there can only be a single home address, etc. These rules, which are generally applicable to updates made by clients that have consistent connections to the system of record and do not require deferred synchronization, are reused here in the context of deferred data synchronization. In other words, the same set of rules only needs to be configured once, and code making verifications according to the set of rules can be invoked when any instantaneously updated modification is made to a work unit by a client with consistent connections to the server (e.g., a modification made by client 120 that is updated at the system of record instantaneously), as well as when a deferred modification is made to the work unit by a client with an intermittent connection to the server. Using the example discussed previously, when the claims adjuster's client device performs synchronization and the modified financial data regarding the reimbursement check is sent to the system of record, a conflict is detected because the same reimbursement is made twice, thus violating the rule that only permits a single reimbursement to be made.

If no conflict is detected, no action is required. In the event that a conflict is detected, at 254, a notification is generated. The notification can be an email, a text message, a system message, an HTML page, or in any other appropriate form. In some embodiments, the notification includes information regarding the conflict and/or a request for a conflict-resolving activity to be performed. In some embodiments, the rules also specify the information to send in response and/or the conflict-resolving activity in the event that a conflict is detected. For example, in the event that two checks are issued for a specific amount, the conflict-resolving activity requires the person who issued the second check (as determined by the timestamp of the time the activity is received by the system of record) to contact the recipient, and either retrieve the check or cancel the check with the bank.

Figure 3:
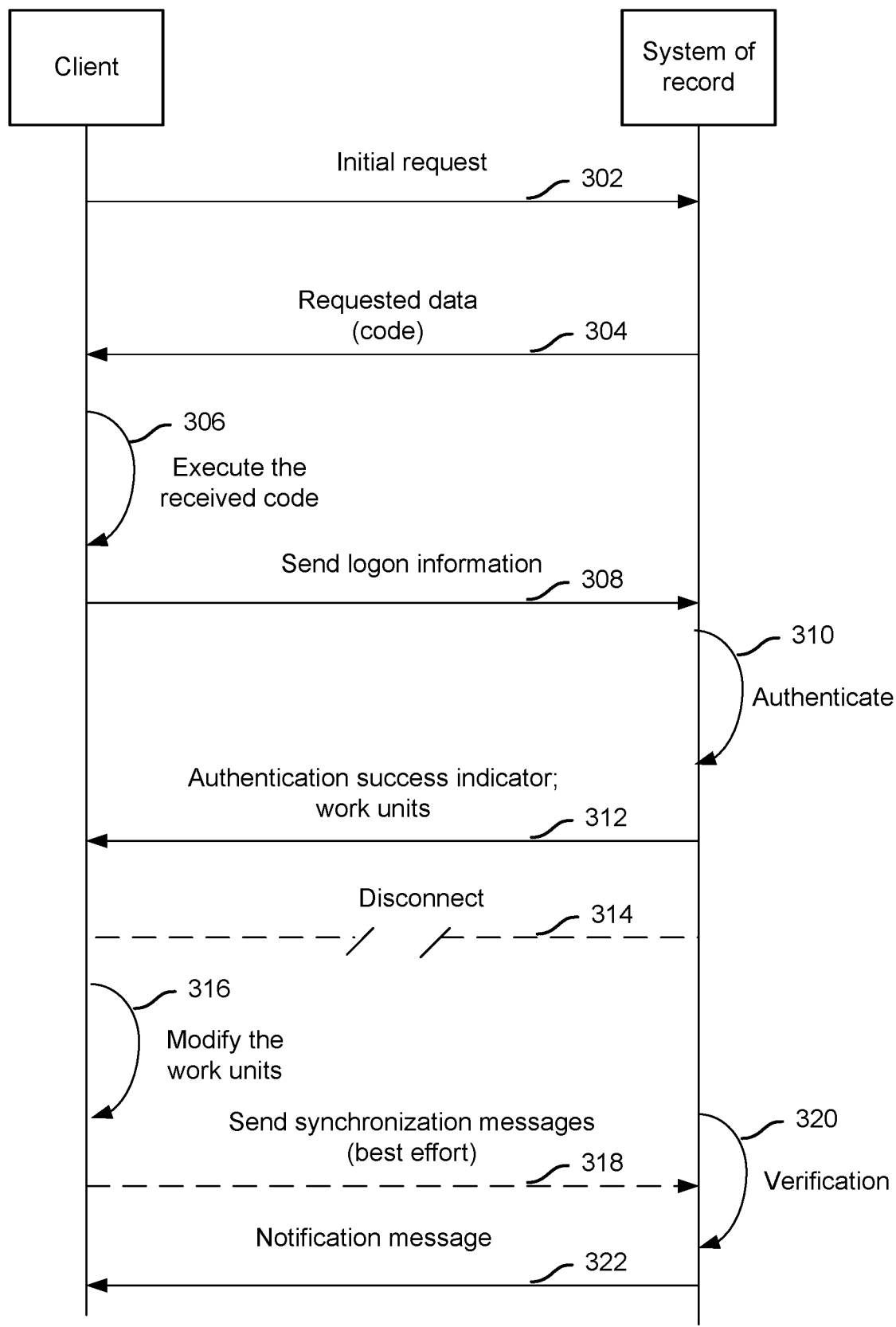
FIG. 3 is a message diagram illustrating example messages exchanged between the client device and the system of record during a deferred data synchronization cycle.

FIG. 3 is a message diagram illustrating example messages exchanged between the client device and the system of record during a deferred data synchronization cycle.

Initially, the client device is connected to the system of record. For example, the claims adjuster may connect his tablet to the system of record before he leaves the central office and goes to the field location. At 302, the client device sends an initial request to the system of record to obtain application related code. In some embodiments, the initial request is sent by a browser executing on the client device and includes an HTTP GET or HTTP POST message to a universal resource locator (URL) of the system of record. A browser/HTTP-based example is discussed extensively below for purposes of illustration, although the initial request can also be sent by a standalone application executing on the client device and formatted using any existing or proprietary protocol.

At 304, the system of record responds with the requested data, such as returning a set of HTML and/or JavaScript code used to implement functions on the client device, such as the login interface, data editing, and synchronization interfaces, etc.

At 306, the received code is executed on the client device. Specifically, a login interface is presented to the user for the user to enter user name and password at this point. Additional code is executed after the user successfully logs in.

At 308, the login information is sent to the system of record using any appropriate protocol.

At 310, the system of record performs authentication using the login information by looking up the login credentials in its user database.

At 312, an optional status indicator indicating whether the authentication succeeded is sent to the client device. In the event that the authentication failed, the process terminates, or returns to 306 until the authentication succeeds. In the event that the authentication succeeded, copies of one or more work units assigned to the user (e.g., ten claims that are assigned to a claims adjuster) are also sent to the client device. In some embodiments, the work units are described using one or more XML files or JSON files, which are transferred to the client device. In some embodiments, because the data associated with each work unit can be sizable, portions of the work units are configured with different levels of priority (e.g., a category, subcategory, or element can be marked with one or more priority flags or markers), stored in respective priority queues, and sent to the client device in the order according to their priority level. For example, financial-related information is given higher priority than contact information, which is given higher priority than notes. In some embodiments, within a priority queue, sub-priority queues are used based on the data associated with the type of category. For example, text notes are given higher priority than images or video data and therefore are sent first. In some embodiments, hashes of the work units (or portions thereof) are checked using the techniques described and only work units (or portions thereof) that have different hashes on the system of record and the client device are sent.

The browser or application on the client device maintains these copies of the work units and displays them to the user as needed. At 314, the client device and the system of record are disconnected. This may happen, for example, when the connection is lost (e.g., when the claims adjuster leaves a WiFi coverage area to go to a different location) or according to a schedule setup for deferred synchronization.

Subsequently, at 316, the user makes modifications to one or more work units on the client device. Specifically, modifications are made within the browser or the application to the elements of the one or more work units. For example, the claims adjuster can add or modify contacts, financials, notes, pictures, videos, etc. The modified copies of work units are maintained at the client device until they are synchronized with the system of record.

At 318, one or more synchronization messages are sent to the system of record. The synchronization messages can include data stored in priority queues that need to be updated. In some embodiments, each priority queue sends a corresponding synchronization message. The synchronization is best-effort synchronization.

At 320, the system of record performs verification on the synchronization data received from the client device. In some embodiments, the verification involves checking the synchronization data with existing states of the work units on the system of record.

At 322, one or more notification messages regarding conflicts and conflict-resolving activities are sent.

318-322 may be repeated multiple times in some cases.

In some embodiments, the synchronization of data on the client device with data on the system of record is specified according to a preconfigured schedule. A timer is used to determine when to retrieve work unit data from the system of record and when to send modification data from the client device to the system of record. In some embodiments, the preconfigured synchronization schedule can be overwritten. For example, a user interface tool such as a button is provided in the client interface. Depending on the state of the client device, the user interface tool can have a different presentation specific to the state.

FIGS. 4A-4D are diagrams illustrating an example user interface tool in different states. In these examples, the user interface tool is a "synch" button presented in a toolbar or some other appropriate region of the user interface displayed on the client device.

Figure 4A:
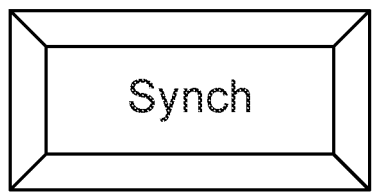
FIGS. 4A-4D are diagram illustrating an example user interface tool in different states.

In a first state shown in FIG. 4A, either the client device has never synchronized with the system of record or there has been no change on the client device since the last time the client device synchronized its data with the system of record. Thus, the synch button is displayed with a normal, clickable appearance. The user can click the synch button to retrieve up-to-date work unit data from the system of record.

Figure 4B:
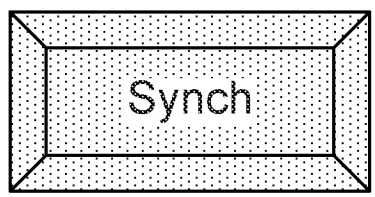

In a second state shown in FIG. 4B, there have been modifications to the copies of work units temporarily stored on the client device, and the modifications are not yet synchronized with the system of record. Thus, the synch button has a different appearance than FIG. 4A (e.g., showing a different color and/or pattern) but is still clickable. When the user clicks the synch button in this state, modifications from the client device are pushed to the system of record.

Figure 4C:
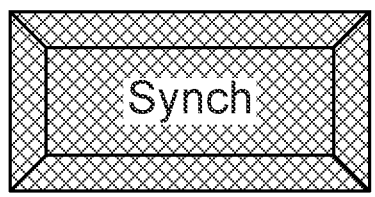
Figure 4D:
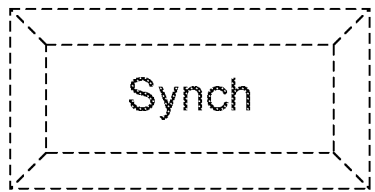

In a third state shown in FIG. 4C, there has been a modification made on the system of record (e.g., by a different client device), and the modification is received by the current client device but not displayed. This is because when the user is editing work unit data on the client device, automatically updating modifications received from the system of record can be disruptive to the user's experience. Thus, the synch button has yet another different appearance than FIGS. 4A and 4B, showing yet another different color or pattern. When the user clicks the synch button in this state, the present user interface and its associated data are refreshed using the received data.

In states shown in FIGS. 4A-4C, a network connection is available between the client device and the system of record, thus the user is able to manually cause synchronization to occur. In the fourth state shown in FIG. 4D, there is no connection between the client device and the system of record. As such, the synch button is shown as disabled.

Figure 5:
FIG. 5 is a user interface diagram illustrating an embodiment of a screen showing edited items that are deferred from synchronization.

In some embodiments, other visual indicators can be used to indicate the state of specific data being edited. FIG. 5 is a user interface diagram illustrating an embodiment of a screen showing edited items that are deferred from synchronization. In this example, an element of a work unit (in this case, information of a contact) is edited locally. Various types of elements can be modified, such as activities indicating what the user is working on, notes showing specific information pertaining to elements, contact information, financial data, documents, todo-items or activities, etc. A visual indicator (which can be a highlighting color, a pattern, a shape, etc.) is used to indicate that a change is maintained locally but not yet synchronized with the system of record. In this case, a pattern 502 is used to indicate that contact information has changed. If any other elements were modified, the same type of visual indicator is displayed in connection with the elements to indicate that their state was modified. Using a consistent user interface scheme (e.g., visual indicators of the same color or pattern) to show the modified elements makes it easier for the user to detect the state associated with the elements.

Figure 6:
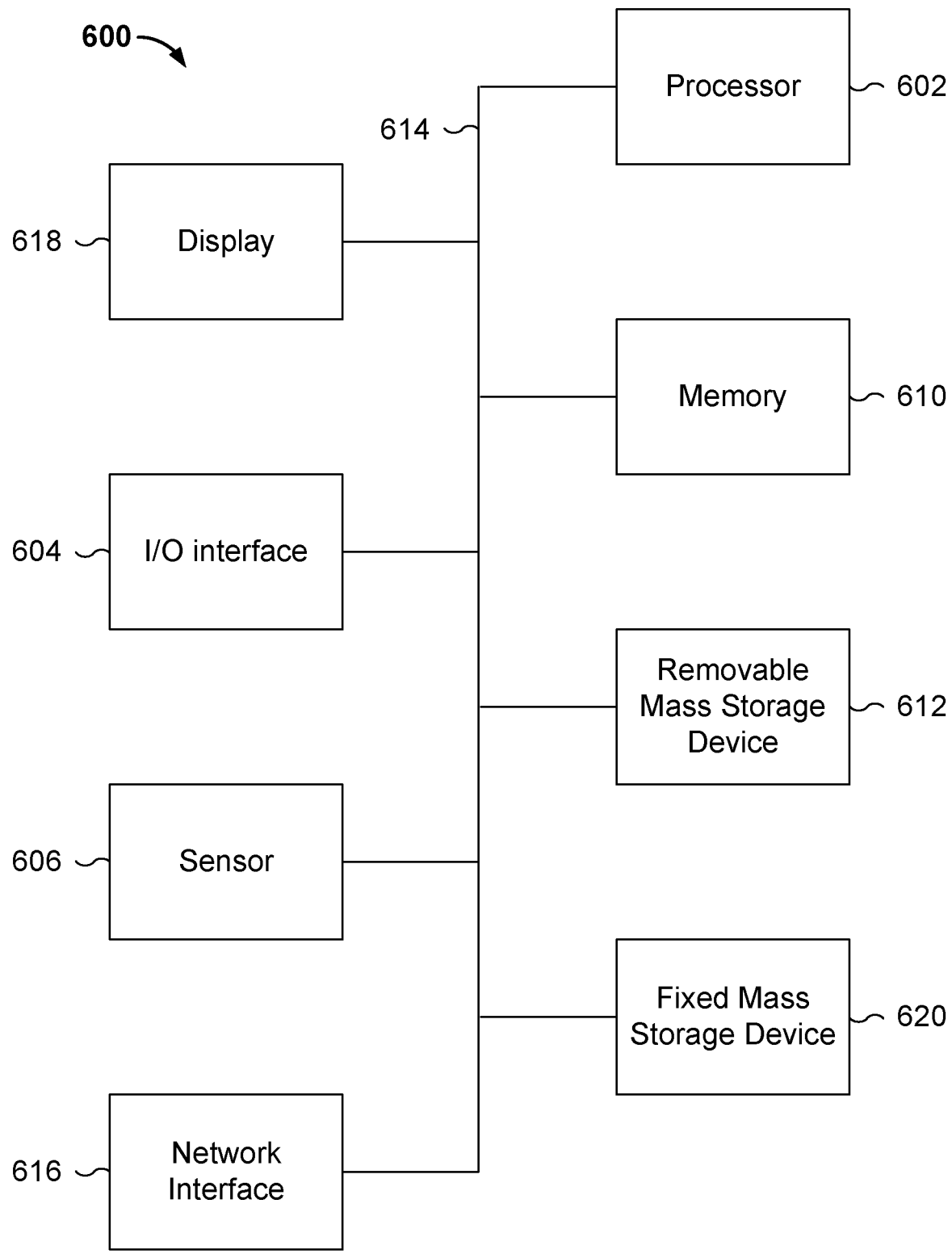
FIG. 6 is a functional diagram illustrating a programmed computer system for deferred data synchronization in accordance with some embodiments.

FIG. 6 is a functional diagram illustrating a programmed computer system for deferred data synchronization in accordance with some embodiments. As will be apparent, other computer system architectures and configurations can be used to perform the described deferred data synchronization technique. Computer system 600, which includes various subsystems as described below, includes at least one microprocessor subsystem (also referred to as a processor or a central processing unit (CPU) 602). For example, processor 602 can be implemented by a single-chip processor or by multiple processors. In some embodiments, processor 602 is a general purpose digital processor that controls the operation of the computer system 600. In some embodiments, processor 602 also includes one or more coprocessors or special purpose processors (e.g., a graphics processor, a network processor, etc.). Using instructions retrieved from memory 610, processor 602 controls the reception and manipulation of input data received on an input device (e.g., sensor 606, I/O device interface 604), and the output and display of data on output devices (e.g., display 618).

Processor 602 is coupled bi-directionally with memory 610, which can include, for example, one or more random access memories (RAM) and/or one or more read-only memories (ROM). As is well known in the art, memory 610 can be used as a general storage area, a temporary (e.g., scratch pad) memory, and/or a cache memory. Memory 610 can also be used to store input data and processed data, as well as to store programming instructions and data, in the form of data objects and text objects, in addition to other data and instructions for processes operating on processor 602. Also as is well known in the art, memory 610 typically includes basic operating instructions, program code, data, and objects used by the processor 602 to perform its functions (e.g., programmed instructions). For example, memory 610 can include any suitable computer readable storage media described below, depending on whether, for example, data access needs to be bi-directional or uni-directional. For example, processor 602 can also directly and very rapidly retrieve and store frequently needed data in a cache memory included in memory 610.

A removable mass storage device 612 provides additional data storage capacity for the computer system 600, and is optionally coupled either bi-directionally (read/write) or uni-directionally (read only) to processor 602. A fixed mass storage 620 can also, for example, provide additional data storage capacity. For example, storage devices 612 and/or 620 can include computer readable media such as magnetic tape, flash memory, PC-CARDS, portable mass storage devices such as hard drives (e.g., magnetic, optical, or solid state drives), holographic storage devices, and other storage devices. Mass storages 612 and/or 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can be used to provide access to other subsystems and devices as well. As shown, these can include a display 618, a network interface 616, an input/output (I/O) device interface 604, an image processing device 606, as well as other subsystems and devices. For example, image processing device 606 can include a camera, a scanner, etc.; I/O device interface 604 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 600. Multiple I/O device interfaces can be used in conjunction with computer system 600. The I/O device interface can include general and customized interfaces that allow the processor 602 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 616 allows processor 602 to be coupled to another computer, computer network, or telecommunications network using a network connection as shown. For example, through the network interface 616, the processor 602 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 6 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 604 and display 618 share the touch sensitive screen component, which both detects user inputs and displays outputs to the user). In addition, bus 614 is illustrative of any interconnection scheme serving to link the subsystems. Other computer architectures having different configurations of subsystems can also be utilized.

Deferred synchronization has been described. The technique reduces bandwidth demands for works that collect data in the field where network connection is often unreliable, prevents conflicts that may occur due to deferred synchronization, minimizes programming overhead, and reduces latency demands.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining at least a portion of a copy of a work unit from an insurance policy management system of record, wherein:
        the work unit corresponds to a content item with respect to an insurance policy; and
        the work unit comprises a plurality of categories of the insurance policy, each category comprising a set of one or more elements;
    while a client device is offline with respect to the insurance policy management system of record, performing an offline action that includes a first modification to a first element of the copy of the work unit, recording locally the first modification to the first element of the copy of the work unit, and deferring synchronization of the first modification with the insurance policy management system of record by storing the first modification to the first element of the copy of the work unit locally at the client device;
    receiving, from the insurance policy management system of record, information including a second modification to a second element of the work unit, wherein the received information is not immediately displayed at the client device;
    displaying, at a user interface of the client device, an indication indicating that the second element has been modified at the insurance policy management system of record and an associated value of the second element has not been displayed; and
    in response to at least a determination that the client device is online with respect to the insurance policy management system of record, synchronizing the first modification with the insurance policy management system of record, including:
        providing, by the client device, to the insurance policy management system of record a hash value or version information corresponding to the first modification of the at least the first element of the copy of the work unit, wherein the hash value or version information is determined at a category level or element level;
        in response to a determination that first modification has not been synchronized between the client device and the insurance policy management system of record based at least in part on the hash value or the version information, providing, by the client device, the insurance policy management system of record with information corresponding to the first modification, wherein the information corresponding to the first modification corresponds to information having a granularity according to a corresponding category or the first element; and
        causing the insurance policy management system of record to detect whether the first modification is in conflict with the work unit on the insurance policy management system of record.

2. The method of claim 1, further comprising receiving from the insurance policy management system of record a notification in response to a determination that the first modification is in conflict with an existing state of the work unit on the insurance policy management system of record.

3. The method of claim 2, wherein the notification includes a request for a conflict-resolving activity to be performed.

4. The method of claim 1, wherein prior to the synchronization of the first modification with the insurance policy management system of record, the method further comprises displaying a visual indication that the first element is modified but not synchronized.

5. The method of claim 1, wherein the plurality of categories has a corresponding plurality of queues storing modifications to elements belonging to respective categories.

6. The method of claim 5, wherein the plurality of queues are prioritized according to their respective order of synchronization.

7. The method of claim 1, wherein the synchronization of the first modification with the insurance policy management system of record further comprises causing the insurance policy management system of record to invoke a set of update logic that is also used to implement an instantaneous update of the first modification to the work unit at the insurance policy management system of record.

8. The method of claim 1, further comprising retrieving at least a portion of the work unit from the insurance policy management system of record in response to a determination that at least the portion of the work unit at the insurance policy management system of record has been modified since it was last retrieved.

9. The method of claim 8, wherein the determination is based at least in part on comparing a hash value associated with at least the portion of the work unit on the insurance policy management system of record and a hash value associated with at least the portion of the copy of the work unit on the client device.

10. The method of claim 1, wherein the first modification is deemed to be in conflict with the work unit on the insurance policy management system of record in response to a determination that the first modification violates a preconfigured rule.

11. The method of claim 1, wherein the first modification is synchronized with the insurance policy management system of record according to one or more priority rules with respect to the work unit or the plurality of categories, the one or more priority rules provide a higher priority for financial-related information than user notes, and the one or more priority rules provide priorities for synchronization of modifications based on a relative priorities of categories respectively corresponding to the modifications.

12. The method of claim 1, wherein the content item corresponds to one of an insurance claim, an insurance policy, a process, and a transaction.

13. The method of claim 1, wherein the synchronization of the first modification includes synchronize the first modification according to a priority of the first modification in relation to priorities of other modifications within one or more priority queues.

14. A client device, comprising:
one or more hardware processors to:
obtain at least a portion of a copy of a work unit from an insurance policy management system of record, wherein:
the work unit corresponds to a content item with respect to an insurance policy; and
the work unit comprises a plurality of categories of the insurance policy, each category comprising a set of one or more elements;
while the client device is offline with respect to the insurance policy management system of record, perform an offline action that includes a first modification to a first element of the copy of the work unit, record locally the first modification to the first element of the copy of the work unit, and defer synchronization of the first modification with the insurance policy management system of record by storing the first modification to the first element of the copy of the work unit locally at the client device;
receive, from the insurance policy management system of record, information including a second modification to a second element of the work unit, wherein the received information is not immediately displayed at the client device;
display, at a user interface of the client device, an indication indicating that the second element has been modified at the insurance policy management system of record and an associated value of the second element has not been displayed; and
synchronize, by the device, the first modification with the insurance policy management system of record, wherein the first modification is synchronized in response to at least a determination that the client device is online with respect to the insurance policy management system of record, and to synchronize the first modification includes:
to provide, by the client device, to the insurance policy management system of record a hash value or version information corresponding to the first modification of the at least the first element of the copy of the work unit, wherein the hash value or version information is determined at a category level or element level;
to provide, by the client device, the insurance policy management system of record with information corresponding to the first modification in response to a determination that first modification has not been synchronized between the client device and the insurance policy management system of record based at least in part on the hash value or the version information, wherein the information corresponding to the first modification corresponds to information having a granularity according to a corresponding category or the first element; and
to cause the insurance policy management system of record to detect whether the first modification is in conflict with the work unit on the insurance policy management system of record; and
a communication interface coupled to the one or more processors and to communicate with the system of record.

15. The client device of claim 14, wherein the one or more processors are further to receive from the insurance policy management system of record a notification in response to a determination that the first modification is in conflict with an existing state of the work unit on the insurance policy management system of record.

16. The client device of claim 15, wherein the notification includes a request for a conflict-resolving activity to be performed.

17. The client device of claim 14, wherein prior to the synchronization of the first modification with the insurance policy management system of record, the one or more processors are further to cause a visual indication to be displayed indicating that the first element is modified but not synchronized.

18. The client device of claim 14, wherein the plurality of categories have a corresponding plurality of queues storing modifications to elements belonging to respective categories.

19. The client device of claim 18, wherein the plurality of queues are prioritized according to their respective order of synchronization.

20. The client device of claim 14, wherein to synchronize the first modification with the insurance policy management system of record further includes to cause the insurance policy management system of record to invoke a set of update logic that is also used to implement an instantaneous update of the first modification to the work unit at the system of record.

21. The client device of claim 14, wherein the one or more processors are further to retrieve at least a portion of the work unit from the insurance policy management system of record in response to a determination that at least the portion of the work unit at the insurance policy management system of record has been modified since it was last retrieved.

22. The client device of claim 21, wherein the determination is based at least in part on comparing a hash value associated with at least the portion of the work unit on the insurance policy management system of record and a hash value associated with at least the portion of the copy of the work unit on the device.

23. A computer program product, the computer program product being embodied in a tangible non-transitory computer readable storage medium and comprising computer instructions that when executed cause one or more processors to:
- obtain at least a portion of a copy of a work unit from an insurance policy management system of record, wherein:
  - the work unit corresponds to a content item with respect to an insurance policy; and
  - the work unit comprises a plurality of categories of the insurance policy, each category comprising a set of one or more elements;
- while a client device is offline with respect to the insurance policy management system of record, perform an offline action that includes a first modification to a first element of the copy of the work unit, recording locally the first modification to the first element of the copy of the work unit, and defer synchronization of the first modification with the insurance policy management system of record by storing the first modification to the first element of the copy of the work unit locally at the client device;
- receive, from the insurance policy management system of record, information including a second modification to a second element of the work unit, wherein the received information is not immediately displayed at the client device;
- display at a user interface of the client device, an indication indicating that the second element has been modified at the system of record and an associated value of the second element has not been displayed; and
- in response to at least a determination that the client device is online with respect to the insurance policy management system of record, synchronize the first modification with the insurance policy management system of record, including:
  - providing, by the client device, to the insurance policy management system of record a hash value or version information corresponding to the first modification of the at least the first element of the copy of the work unit, wherein the hash value or version information is determined at a category level or element level;
  - in response to a determination that first modification has not been synchronized between the client device and the insurance policy management system of record based at least in part on the hash value or the version information, providing the insurance policy management system of record with information corresponding to the first modification, wherein the information corresponding to the first modification corresponds to information having a granularity according to a corresponding category or the first element; and
  - causing the insurance policy management system of record to detect whether the first modification is in conflict with the work unit on the insurance policy management system of record.

* * * * *